United States Patent [19]
Schmidt

[11] Patent Number: 5,878,027
[45] Date of Patent: Mar. 2, 1999

[54] EPISODIC TRAFFIC MONITOR

[75] Inventor: Douglas C. Schmidt, Holmdel, N.J.

[73] Assignee: AT & T Corp, Middletown, N.J.

[21] Appl. No.: 799,888

[22] Filed: Feb. 13, 1997

[51] Int. Cl.⁶ .................................................. H04L 12/26
[52] U.S. Cl. ........................................ 370/232; 370/236
[58] Field of Search .................................... 370/229, 230, 370/231, 232, 233, 234, 235, 236, 253; 395/184.01, 185.01, 200.53, 200.55, 200.63, 200.65

[56] References Cited

U.S. PATENT DOCUMENTS

| | | | |
|---|---|---|---|
| 5,138,616 | 8/1992 | Wagner, Jr. et al. | 371/5.1 |
| 5,285,442 | 2/1994 | Iwamura et al. | 370/234 |
| 5,671,216 | 9/1997 | Subashinha et al. | 370/230 |
| 5,745,478 | 4/1998 | Van Der Wal | 370/234 |
| 5,751,969 | 5/1998 | Kapoor | 395/200.65 |

OTHER PUBLICATIONS

Dan Minor Common Channel Signaling System number 7, DataPro, Jun. 1996 The McGraw–Hill Companyies, Inc., pp. 1–18.

Peter Schmid, Christian Ris, and Bjorn Saeteroy, Management of the CCS®7 Network: an evolutionary approach, pp. 8–17, from tec ascom technical magazine, Feb. 1994, by Ascom Holding Ltd.

Murt Walker, CCS7 Offers New Paths To revenue Generating Services, AT & T Technology vol. 6 No. 2, 1991, pp. 8–15.

Dan Minoli, Signaling Concepts, DataPro, pp. 1–13, Jul. 1996 The McGraw–Hill Companies, Inc.

*Primary Examiner*—Chau Nguyen
*Assistant Examiner*—Soon-Dong Hyun
*Attorney, Agent, or Firm*—Robert B. Levy

[57] ABSTRACT

The rate at which messages are transmitted through a network (10) is monitored to first determine whether a statistically significant number of messages occurred within a prescribed interval. If so, then the number of messages within the interval is compared to a threshold representing an intolerable threshold established on a probabilistic basis. Should the number of messages exceed the threshold, an alarm is generated.

5 Claims, 2 Drawing Sheets

5,878,027

EPISODIC TRAFFIC MONITOR

TECHNICAL FIELD

This invention relates to a technique for monitoring the traffic transmitted across a network to determine if the traffic transmission rate exceeds a prescribed threshold.

BACKGROUND ART

Certain providers of telecommunications services, such as AT&T, maintain networks that include facilities for transmitting voice, video, and/or data and separate facilities for transmitting signaling information. The signaling information is transmitted "out-of-band", that is, the signaling information is transmitted on trunks separate from those carrying the voice, video, and/or data. AT&T's signaling network, referred to as the Common Channel Signaling System 7 (CCSS7), is well known. The CCSS 7 signaling network utilizes high-speed links to provide rapid transmission of signaling information between network elements to communicate information associated with call set-up and break down.

In the past, the signaling network maintained by most telecommunication service providers has been closed except to other telecommunication services providers who require interconnection to facilitate call completion between carriers. Recently, some telecommunication providers, such as AT&T, have opened their signaling networks to non-telecommunication service providers, to allow such non-service providers to transmit traffic in exchange for a fee, usually based on the rate of traffic. For ease of discussion, signaling traffic from non-telecommunications service providers is referred to as "alien" traffic, as opposed to signaling traffic generated by telecommunications service providers for call processing purposes.

While the amount of alien traffic is presently small, as compared to signaling traffic generated by telecommunications service providers, the amount of alien traffic will likely increase in the future. Consequently, the likelihood that providers of alien traffic will abuse the signaling network will increase. Indeed, excessive amounts of alien traffic could adversely impact the signaling network, possibly resulting in service outages.

Thus, there is need for a technique for monitoring signaling traffic in network.

BRIEF SUMMARY OF THE INVENTION

Briefly, in accordance with the invention, a technique is provided for monitoring messages transmitted through a network, such as a signaling network. Each message is typically B bits long where B is an integer that can differ from evaluation to evaluation. There may be N messages where N is an integer that may vary from evaluation to evaluation. The monitoring is conducted to determine whether the transmission rate exceeds a threshold rate of $\lambda$ bits per second on a probabilistic basis. The method is commenced by monitoring whether a statistically significant number of messages have arrived since the last evaluation. The last evaluation may have occurred during a previous interval (episode) of T seconds in duration if the arrival rate of messages is heavy, or the last evaluation may have occurred several episodes ago if the message rate is light. If not enough messages have arrived, the monitoring step is repeated until a statistically significant number of messages have arrived. Once a statistically significant statistically significant number of messages have arrived, then the number of messages is compared to a threshold representing the maximum tolerable rate of $\lambda$ bits per second. If the transmission rate exceeds the threshold, then an alarm is generated.

DETAILED DESCRIPTION

Figure 1:
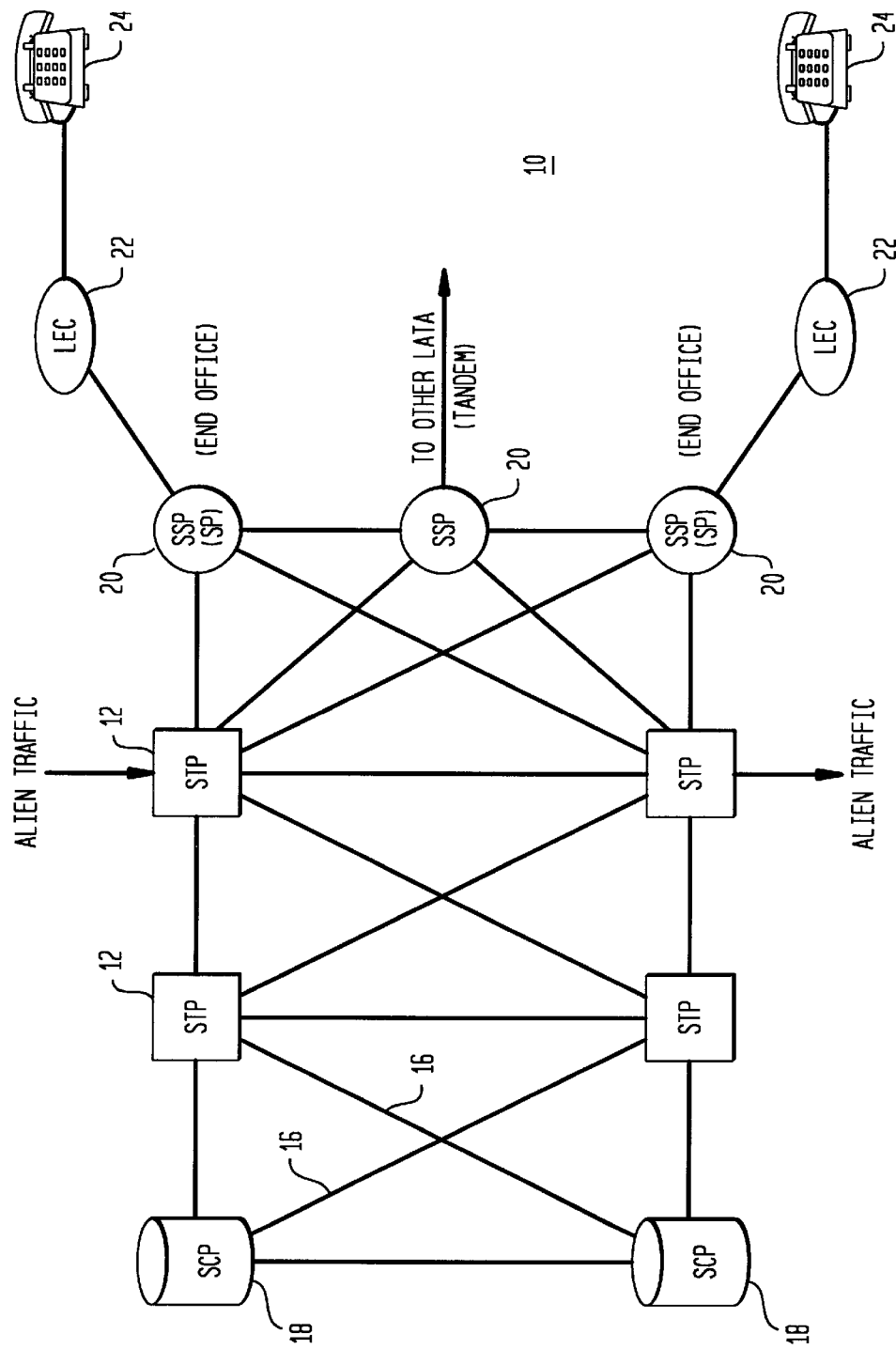
FIG. 1 is a block schematic diagram of a Common Channeling Signaling System (CCSS) in accordance with the prior art.

Before proceeding to discuss the monitoring technique of the invention, some background information regarding signaling systems may prove useful. FIG. 1 depicts a block schematic diagram of a prior art Common Channel Signaling System (CCSS) network 10, such as the CCSS7 network presently maintained by AT&T. The network 10 includes a plurality of Service Transfer Points (STPs) 14—14 interconnected to each other via a set of signaling links 16—16. The STPs each comprises a packet switch of a type well known in the art for routing signaling information within the network 10. The network 10 also includes a plurality of Service Control Points (SCPs) 18—18 interconnected to the SCPs via the signaling links 16—16. The SCPs 18—18 each typically comprises a data base for storing information associated with call completion.

One of more of the STPs 12—12 is linked to at least one Service Switching Point (SSP), such as one of SSPs 20—20. One or more of the SSPs 20—20 may comprise a local (End Office) telecommunications switch of a type well known in the art for routing calls to and from a Local Exchange Carrier (LEC) serving callers, each represented by a station set 24. Alternatively, one or more of the SSPs 20—20 may comprise a toll switch for routing calls to another such toll switch (not shown).

In operation, the STPs 12—12 pass signaling information among the switches 20—20, as well as permit the switches to access one or more SCPs 18—18 to facilitate call completion. Traditionally, the signaling network 10 has been closed except to telecommunication service providers, such as the LECs 22—22, who utilize the signaling information to route calls to and from the network. Recently, non-telecommunication service providers have been given the opportunity utilize the network 10 to transmit signaling traffic of a type other than associated with call completion. Such signaling traffic, depicted in FIG. 1 as "Alien traffic" may be received at any of the STPs 12—12 for passage to any other STP.

Non-telecommunication service provides utilizing the network 10 to transmit signaling traffic typically agree to transmit no more than $\lambda$ bits per second. A sustained transmission of more than $\lambda$ bits per minute constitutes an abuse of the network and appropriate action may be necessary. For example, it may be necessary to block alien traffic if the rate exceeds the established limit for a sustained period of time, or alternatively, to allow such traffic but assess a higher cost associated with the excess transmission.

A simplistic approach to monitoring the signaling traffic would be to generate an alarm if the actual traffic transmission within an interval of T seconds exceeds $\lambda T$. Unfortunately, traffic rates at or near $\lambda$ may exceed this threshold frequently, for very brief instances. From the point of view of the entity responsible for maintaining the network 10, occasional excesses may be acceptable. However, sustained intervals when $\lambda T$ exceeds the threshold are not.

In accordance with the invention, a monitoring technique is provided for monitoring the alien traffic to determine whether the traffic rate exceeds a threshold representing an intolerable overload of $\epsilon\lambda$ where $\epsilon$ is the ratio of a minimum unacceptable bit rate to a maximum allowable bit rate. As will become understood in greater detail below, the monitoring technique of the invention, typically executed by the STP 12 of FIG. 1 initially receiving the alien traffic, depends on the following six parameters:

1. $\lambda$, the maximum sustained message load in bits/second;
2. T, the episode duration;
3. $\epsilon$, the ratio of the minimum unacceptable bit rate to a maximum allowable bit rate;
4. $\alpha$, the number of standard deviations above the mean of the total traffic at the offered load rate of $\lambda$ in an episode that will enable an alarm with a high probability;
5. $\beta$, the number of standard deviations below the mean of the total traffic at the offered load rate of $\epsilon\lambda$ in an episode that will enable an alarm with a high probability; and
6. $\hat{C V}$ is an upper bound on the coefficient of variation of message length ($CV_m$). For instance, $CV_M$ is less than two for messages within the CCSS 7 network 10 of FIG. 1.

Therefore, $\hat{C V}$ is taken to be 2 for the alien traffic in the network 10 of FIG. 1.

Figure 2:
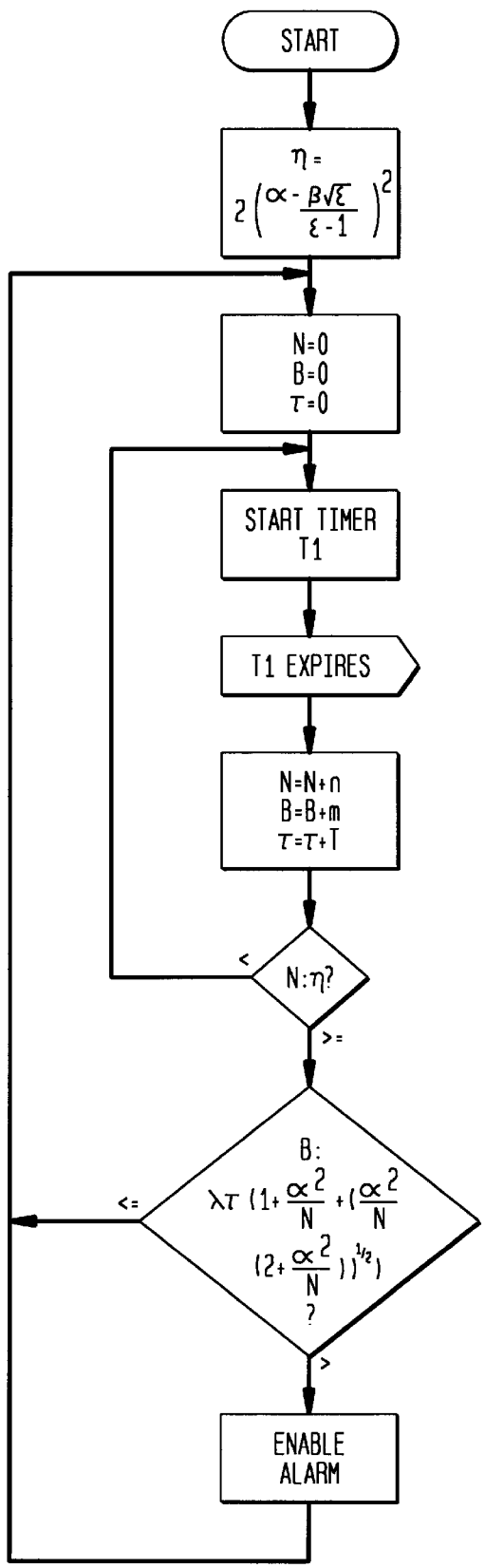
FIG. 2 is a flow chart representation of a method in accordance with the invention, for monitoring the signaling traffic in the CCSS of FIG. 1

The monitoring technique of the invention is depicted in flow-chart form in FIG. 2. The process is initiated upon execution of a start instruction (step 100). Thereafter, three variables, B, N, and $\tau$ are each initialized to zero (step 102). Following step 102, a timer (not shown) is started at T1 (step 102) and counts for T seconds, representing the episode length, nominally five minutes in duration. After the timer counts for T seconds, the episode expires (step 104). Upon the expiration of the episode, step 108 is executed and the variable N, previously set to zero during step 102, is now increased by n, the number of messages that arrived in the just-expired episode. During step 108, The variable B, also previously set to zero, is now increased by m, the number of messages in the previous episode. The variable $\tau$, previously set to zero, is now increased by T, the duration of the previously expired interval.

Following step 108, step 110 is executed and a determination is made whether the variable N is less than the expression $$(1+\hat{CV})\left[\frac{\alpha-\beta\sqrt{\epsilon}}{\epsilon-1}\right]^2.$$

If so, then the number of messages that arrived during the just-expired episode are not statistically significant and step 104, and those following it are re-executed in order to accumulate more message information. When the variable N equals or exceeds the expression $$(1+\hat{CV})\left[\frac{\alpha-\beta\sqrt{\epsilon}}{\epsilon-1}\right]^2,$$

then step 112 is executed,

During step 112, a determination is made whether the variable B, now equal to the number of messages measured during the previous interval, is less or equal to than the expression $$\lambda\tau\left(1+\frac{\alpha^2}{N}+\left(\frac{\alpha^2}{N}\left(2+\frac{\alpha^2}{N}\right)\right)\right)^{1/2}.$$

If so, then step 102, and those following it are re-executed. When the variable B exceeds the expression $$\lambda\tau\left(1+\frac{\alpha^2}{N}+\left(\frac{\alpha^2}{N}\left(2+\frac{\alpha^2}{N}\right)\right)\right)^{1/2},$$

indicating that the number of messages detected during the previous interval exceeds the threshold by a high probability, then step 114 is executed and alarm is enabled. Upon execution of the alarm during step 114, several actions are possible. For example, upon detecting excess alien traffic, the STP 12 receiving the traffic may cease its transmission through the network 10. Alternatively, upon detecting excess alien traffic, the STP 12 may adjust the rate at which the entity generating the traffic is charged.

Following step 114, step 102, and those following it are re-executed. Thus the process of detecting excess traffic is repeated continuously.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for monitoring data transmitted through a network during successive intervals to determine whether the rate at which such data are transmitted exceeds a threshold of $\lambda$ bits per second on a probabilistic basis, comprising the steps of:

monitoring how many bits have been transmitted during an interval to determine whether a statistically significant number of bits have arrived since a prior determination that a significant number of bits have arrived, wherein said statistically significant number of bits is determined from a prescribed relationship among the threshold $\lambda$, a time duration T, a ratio of a minimum unacceptable bit rate to a maximum allowable bit rate $\epsilon$; a number of standard deviations above a mean of the total traffic at an offered load rate of $\lambda$ in an episode that will enable an alarm with a high probability $\alpha$, a number of standard deviations below a mean of the total traffic at an offered load rate of $\epsilon\lambda$ in an episode that will enable an alarm with a high probability $\beta$, and $\hat{C}V$ where $\hat{C}V$ is an upper bound on a coefficient of variation of message length $\hat{C}V_m$, and if so, determining whether the number of bits arrived during the interval exceeds a threshold representing an intolerable overload; and if so, generating an alarm.

2. The method according to claim 1 wherein the monitoring step includes the steps of:

(a) comparing whether the number of bits occurring during the interval T, , is less than $$(1+\hat{CV})\left[\frac{\alpha-\beta\sqrt{\epsilon}}{\epsilon-1}\right]^2$$

and, if the number of blocks is less than $$(1+\hat{CV})\left[\frac{\alpha-\beta\sqrt{\epsilon}}{\epsilon-1}\right]^2,$$

then (b) accumulating the messages in the interval just-expired with messages that occurred previously, and thereafter, (c) repeating step (a).

3. The method according to claim 2 wherein the threshold equals $$\lambda\tau\left(1+\frac{\alpha^2}{N}+\left(\frac{\alpha^2}{N}\left(2+\frac{\alpha^2}{N}\right)\right)^{1/2}\right);$$

where N represents the number of bits; and

τ corresponds to the interval T since the last of the previous evaluation or start-up.

4. The method according to claim 1 further including the step of interrupting the transmission of messages following generation of the alarm.

5. The method according to claim 1 further including the step of increasing a charge for transmitting message blocks following generation of the alarm.

* * * * *